(12) United States Patent
Clark

(10) Patent No.: US 9,401,518 B1
(45) Date of Patent: Jul. 26, 2016

(54) INTEGRATED WATER SEPARATOR AND REACTANT HUMIDIFIER FOR FUEL CELLS

(75) Inventor: David Lawrence Clark, Highlands Ranch, CO (US)

(73) Assignee: Lockheed Martin Corporation, Bethesda, MD (US)

(*) Notice: Subject to any disclaimer, the term of this patent is extended or adjusted under 35 U.S.C. 154(b) by 1131 days.

(21) Appl. No.: 13/304,214

(22) Filed: Nov. 23, 2011

Related U.S. Application Data

(60) Provisional application No. 61/417,151, filed on Nov. 24, 2010.

(51) Int. Cl.
*H01M 8/04119* (2016.01)
*H01M 8/04828* (2016.01)
*H01M 8/04* (2016.01)

(52) U.S. Cl.
CPC ...... *H01M 8/04141* (2013.01); *H01M 8/04835* (2013.01)

(58) Field of Classification Search
CPC ............... H01M 8/04126–8/04149; H01M 8/04828–8/04835
See application file for complete search history.

(56) References Cited

U.S. PATENT DOCUMENTS

| | | | | |
|---|---|---|---|---|
| 5,996,976 A | * | 12/1999 | Murphy et al. | 261/104 |
| 6,432,568 B1 | * | 8/2002 | Salvador et al. | 429/423 |
| 6,953,635 B2 | * | 10/2005 | Suzuki | H01M 8/04119 261/94 |
| 2007/0246847 A1 | * | 10/2007 | Bitoh | H01M 8/04126 261/104 |
| 2008/0187809 A1 | * | 8/2008 | Hibbs et al. | 429/34 |
| 2011/0086281 A1 | * | 4/2011 | Huber | C01B 3/32 429/423 |

* cited by examiner

*Primary Examiner* — Barbara Gilliam
*Assistant Examiner* — Robert S Carrico
(74) *Attorney, Agent, or Firm* — McDermott Will & Emery LLP

(57) ABSTRACT

A humidifier for humidification of a reactant gas in a fuel cell includes a container having a water-gas void volume disposed about a hollow core member, and a water-gas inlet and a gas outlet disposed on an outer surface of the container. At least a portion of the hollow core member is gas permeable and in fluid communication with the water-gas void volume. The hollow core member is further fitted with a reactant gas inlet and a reactant gas outlet for passage of the reactant gas through the hollow core member. The reactant gas outlet is equipped to be in fluid communication with the fuel cell to deliver a humidified reactant gas to the fuel cell. The humidifier is integrated within a fuel cell system. A method of humidifying a reactant gas in such a fuel cell system includes providing the humidifier and passing a reactant gas through it.

12 Claims, 3 Drawing Sheets

INTEGRATED WATER SEPARATOR AND REACTANT HUMIDIFIER FOR FUEL CELLS

CROSS-REFERENCE TO RELATED APPLICATION

The present application claims the benefit of priority from U.S. Provisional Patent Application Ser. No. 61/417,151, entitled "INTEGRATED WATER SEPARATOR AND REACTANT HUMIDIFIER FOR FUEL CELLS," filed on Nov. 24, 2010, which is hereby incorporated by reference in its entirety for all purposes.

STATEMENT REGARDING FEDERALLY SPONSORED RESEARCH OR DEVELOPMENT

The invention was made with Government support under USG Contract No. HR0011-09-C-0036 administered by the Defense Advanced Research Projects Agency (DARPA), and the Government has certain rights in the invention.

FIELD

The present invention is directed to a humidifier for use in a fuel cell system. More particularly, some embodiments are directed to a humidifier that humidifies reactants of the fuel cell system using an integrated water-gas separator and reactant humidifier.

BACKGROUND

Proton exchange membrane (PEM) fuel cells require humidified reactants (typically hydrogen and oxygen and/or air) for highest performance. The life of the PEM fuel cell can also be greatly extended by increasing the humidification of the incoming reactants. Conventional solutions use either a separate humidifier with a pumped water source or gaseous circulation of moist exhaust through a gas/gas humidity exchanger.

SUMMARY

In some aspects, embodiments disclosed herein relate to a humidifier for humidification of a reactant gas in a fuel cell. The humidifier includes a container having a water-gas void volume disposed about a hollow core member, a water-gas inlet and a gas outlet disposed on an outer surface of the container. At least a portion of the hollow core member is gas permeable and in fluid communication with said water-gas void volume. The hollow core member is further fitted with a reactant gas inlet and a reactant gas outlet for passage of reactant gas through the hollow core member. The reactant gas outlet is equipped to be in fluid communication with the fuel cell to deliver a humidified reactant gas to the fuel cell.

In some aspects, embodiments disclosed herein relate to a fuel cell system that includes an integrated fuel cell and a humidifier. The humidifier includes a container having a water-gas void volume disposed about a hollow core member, a water-gas inlet and a gas outlet disposed on an outer surface of the container. At least a portion of the hollow core member is gas permeable and in fluid communication with said water-gas void volume. The hollow core member is further fitted with a reactant gas inlet and a reactant gas outlet for passage of said reactant gas through said hollow core member. The reactant gas outlet is equipped to be in fluid communication with the fuel cell to deliver a humidified reactant gas to the fuel cell.

A method of humidifying a reactant gas in a fuel cell system includes providing a humidifier that includes a container having a water-gas void volume disposed about a hollow core member and a water-gas inlet and a gas outlet disposed on an outer surface of the container. At least a portion of the hollow core member is gas permeable and in fluid communication with the water-gas void volume. The hollow core member is further fitted with a reactant gas inlet and a reactant gas outlet for passage of the reactant gas through the hollow core member. The reactant gas outlet is equipped to be in fluid communication with the fuel cell to deliver a humidified reactant gas to the fuel cell. The method further includes passing a reactant gas through the humidifier.

DETAILED DESCRIPTION

The present invention is directed, in part, to a fuel cell system with an integrated water separator and reactant humidifier. The integrated system takes a water/gas separator (a vertical gravity driven container) and feeds reactant gas through the center of a water permeable membrane bundle. The dry reactant flows up through the water permeable tube bundle and water vapor passes into the dry reactant gas stream based on the different partial pressures.

Reactants in the fuel cell circulate through a water-gas inlet and re-circulated reactant gas comes out a gas outlet. This arrangement encourages proper reactant utilization and collects water produced by the fuel cell reaction. The reactant gas inlet connects to the permeable tube bundle and passes up through the separator where the humidified reactant exits the reactant gas outlet and is fed back into the fuel cell.

The integrated fuel cell humidifier system of the present invention does not require an additional pump, thus making it lighter by eliminating unneeded components. Further, in a conventional gas/gas humidity exchanger, the gases need to be exhausted. This conventional arrangement is typical for a $H_2$/air fuel cell. Such a system is typically found in an automotive application and would only work for the air side of the fuel cell. A further benefit of the present integrated fuel system is that the hydrogen side need not be exhausted. Instead unreacted hydrogen can be recycled into the water-gas inlet. The fuel cell humidifier system of the present invention is also scalable for ease of use in smaller applications as well, such as mobile devices.

Figure 1:
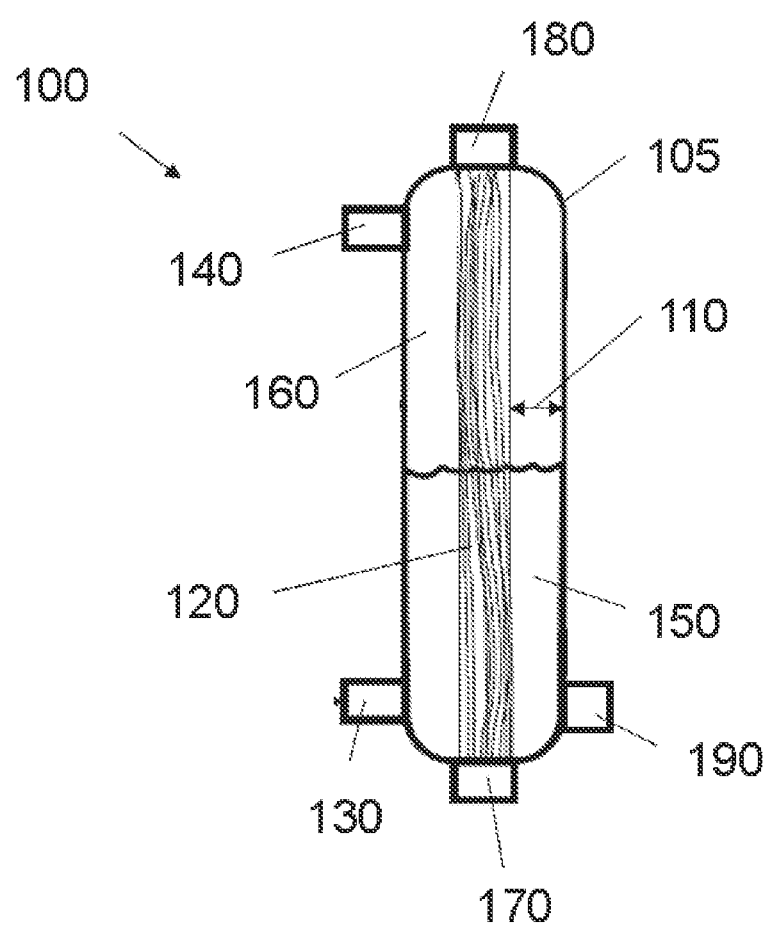
FIG. 1 shows a humidifier of the present invention in accordance with one embodiment of the invention.

Referring now to FIG. 1, in some embodiments, the present invention provides a humidifier 100 for humidification of a reactant gas in a fuel cell. Humidifier 100 includes a container 105 having a water-gas void volume 110 disposed about a hollow core member 120 and a water-gas inlet 130 and a gas outlet 140 disposed on an outer surface of container 105. Although container 105 is depicted as a substantially cylindrical structure, one skilled in the art will appreciate that it can be configured in any desired shape. For example, container 105 may take on a rectangular or square cubic form, a spherical form, an hourglass form, a generally conical or inverted conical form, and so on, as long as the performance of the device is consistent within the working parameters of humidifier 100. Moreover, the inner wall of container 105 may take on a different shape than the general shape of humidifier 100. For example, the inner wall of container 105 may be corrugated. Similarly, although hollow core member 120 is shown as a generally as a cylindrical structure, it can be configured in other shapes, such as a hollow coiled structure or a corrugated structured, either of which can aid in creating a large surface area and/or increased reactant gas residence time, resulting in increased humidification effectiveness.

Water-gas void volume 110 is defined by the space between the inner wall of container 105 and the outer wall of hollow core member 120. Water-gas void volume 110 serves as a vertical water-gas separator separating the water-gas mixture into a water layer 150 and a gas layer 160. In some embodiments, the volume of water-gas void volume 110 is in a range from about 10 to about 5000 mL. Water layer 150 can include pure de-ionized water in some embodiments, while the gas layer 160 can include one of the reactant gases, hydrogen, oxygen, air, or mixtures of air and oxygen. Water layer 150 can include both water delivered from an exogenous source to humidifier 100, as well as recycling the resultant water product generated in the PEM fuel cell along with excess reactant gas for separation in water-gas void volume 110. In some embodiments, water is only provided from an exogenous source. In some embodiments water is provided as a mixture from an exogenous source and recycled water generated in the fuel cell. In still further embodiments, the only water delivered to water-gas void volume 110 is water generated by the fuel cell reaction. Gas layer 160 can include overflow of reactant gas that has passed through the PEM fuel cell. Gas layer 160 can further be redirected into humidifier 100 via reactant gas inlet 170.

At least a portion of hollow core member 120 is gas permeable and in fluid communication with water-gas void volume 110. Water layer 150 is in fluid contact with outer wall of hollow core member 120, providing a source of water vapor to the reactant gas flowing through permeable hollow core member 120. Hollow core member 120 is further fitted with reactant gas inlet 170 and a reactant gas outlet 180 for passage of the reactant gas through hollow core member 120. Reactant gas outlet 180 is equipped to be in fluid communication with the fuel cell to deliver a humidified reactant gas to the fuel cell. Reactant gas inlet 170 receives reactant gas recycled from gas layer 160, as described above. Additional reactant gas can further supplement the recycled gas to maintain a target concentration of reactant gas. Thus, in accordance with some embodiments of the invention, sufficient humidification of a reactant gas is provided via this mechanism to a moisture content in the reactant gas of at least 50% relative humidity. In other embodiments, the moisture level is at least 75% relative humidity. In still further embodiments, the moisture level is at least 80%, at least 85%, at least 90%, or at least 98% relative humidity. In yet still further embodiments, the relative humidity of the reactant gas is at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, and 98%, including fractions thereof.

Humidifier 100 can be fed with a reactant gas that is hydrogen, in some embodiments. Humidifier 100 can be fed with a reactant gas that is air, oxygen, or mixtures of air and oxygen, in other embodiments. Thus, in some embodiments, a fuel cell is equipped to humidify both hydrogen and oxygen-based reactants. Because these components are delivered to different sections of the PEM fuel cell, separate humidifiers can be used for each, as described herein further below. Reactant gases hydrogen and the oxygen source can be provided at low pressures, for example, in a range from about 1 psig to about 10 psig, or from about 2 psig to about 5 psig, in other embodiments.

In some embodiments, humidifier 100 is further equipped with a water drainage valve 190. Water drainage valve 190 can function as a modulator of the water level of water layer 150 allowing excess water to be removed. Drainage valve 190 can also be equipped with a detector to insure that the water level of water layer 150 does not drop below a certain level. In some such embodiments, water drainage valve 190 can be equipped to be in electronic communication with an exogenous water supply to deliver supplemental water to water-gas void volume 110 on and as needed basis.

Figure 2:
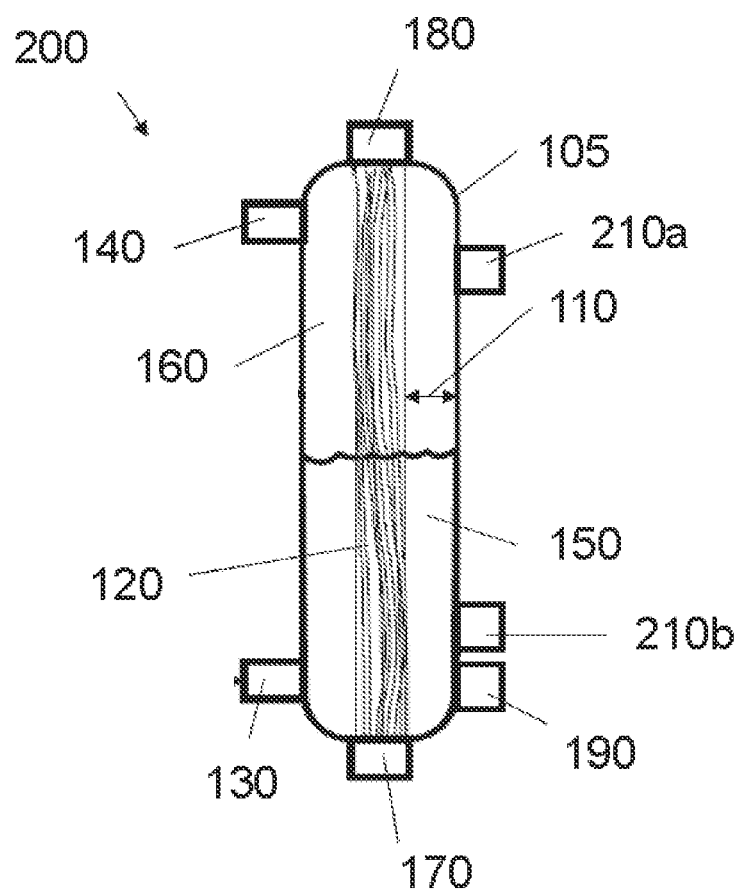
FIG. 2 shows a humidifier of FIG. 1 further equipped with a sensing system.

Referring now to FIG. 2, in some embodiments, humidifier 200 is the same as humidifier 100, but is further equipped with a sensor system comprising an upper sensor 210a and a lower sensor 210b, either or both of which can be in electronic communication with water drainage valve 190. The sensor system can be used to modulate the level of water in water layer 150 of water-gas void volume 110. In some embodiments, upper sensor 210a is in electronic communication with drainage valve 190 to insure that the water level does not exceed a certain level. In some such embodiments, if water layer 150 reaches upper sensor 210a, this can trigger an electronic signal to water drainage valve 190 signaling it to open and drain water. In some embodiments, lower sensor 210b is in electronic communication with an exogenous water source that can deliver additional water to the water-gas void volume 110 as needed. Such sensor systems that may be used in monitoring the level of water layer 150 are well understood by those skilled in the art. Some such systems can be based on various optical characteristics, for example, changes in refractive index, infrared detection, and the like.

In some embodiments, humidifier 100 or 200, as shown in FIG. 1 or FIG. 2, respectively, is equipped with gas outlet 140 which can redirect the reactant gas through to reactant gas inlet 170. In some embodiments, gas outlet 140 can be vented to exhaust. In some embodiments, water vapor exiting gas outlet 140 can also be fed into reactant gas inlet 170 along with the recycled reactant gas. In some embodiments, water vapor entrained with excess reactant gas can be condensed and delivered back into water-gas inlet 130. In some embodiments, humidifier 100 or 200 comprises a reactant gas inlet 170 equipped to receive both externally provided reactant gas and recycled reactant gas from gas outlet 140. In some embodiments, humidifier 100 includes water-gas inlet 130 which is in fluid communication with a fuel cell to receive, i.e. recycle, water generated in the fuel cell as well as the reactant gas.

The components of humidifier 100 or 200 can be provided in any material that is substantially corrosion resistant. In some embodiments, the container is a plastic. In such embodiments, humidifier 100 or 200 can benefit from the relatively light weight of plastic. This can be important in downstream applications, such as in PEM fuel cell devices that might be used in space. In other embodiments, the container is stainless steel. In some embodiments, hollow core member is a permeable tube bundle comprising Nafion or other permeable membrane which allows passage of water vapor therethrough.

Figure 3:
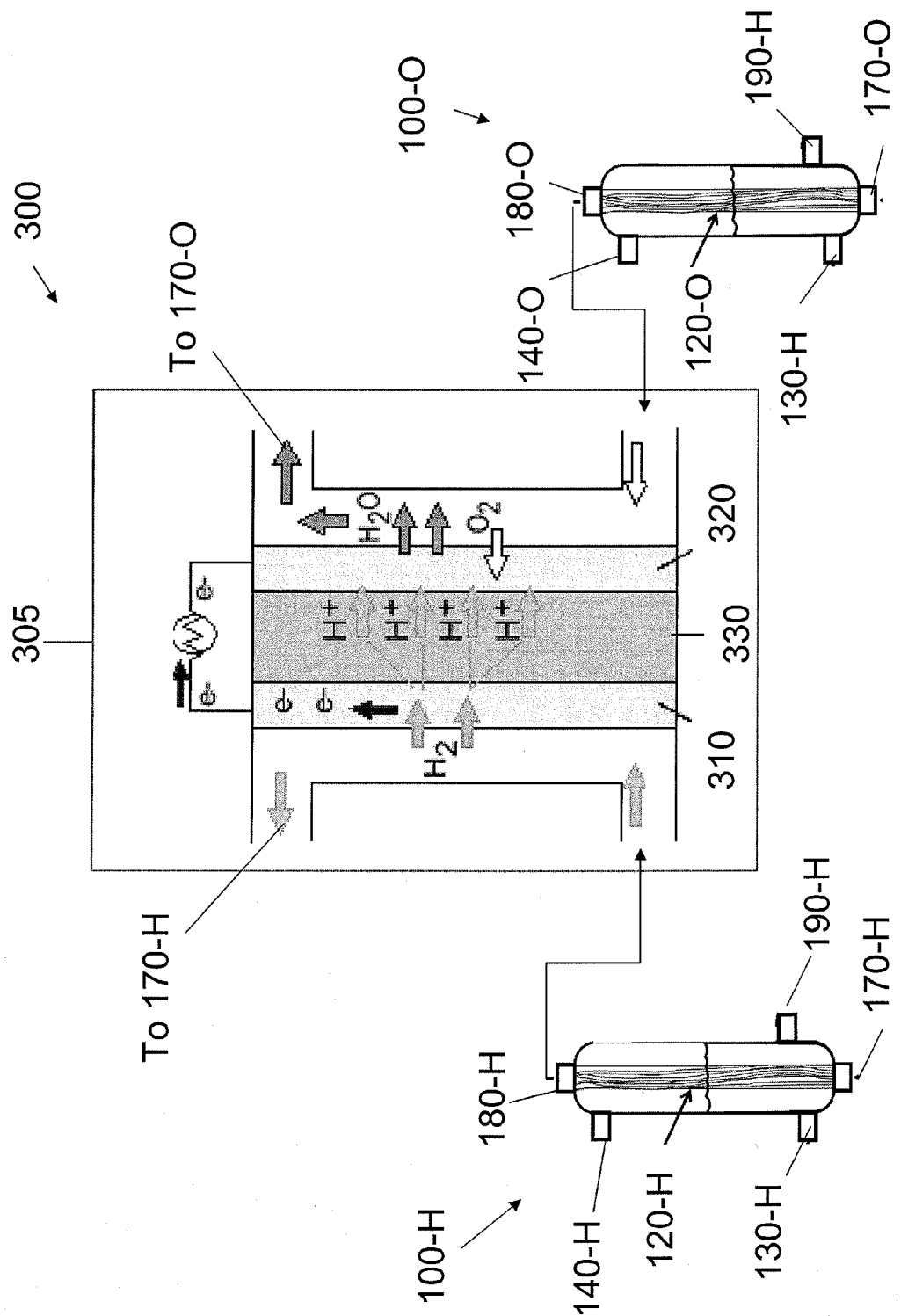
FIG. 3 shows a schematic of a PEM fuel cell and flow of reactants and water relative to the humidifier of the present invention.

Referring now to FIG. 3, in some embodiments, the present invention provides a fuel cell system 300 comprising a fuel cell 305 and a hydrogen-side humidifier 100-H and oxygen-side humidifier 100-O. Fuel cell 305 can be any proton exchange membrane cell known in the art. Such cells comprise a hydrogen-side anode 310, an oxygen-side cathode 320, and electrolyte membrane 330. In some embodiments, electrolyte membrane 330 is made from Nafion. In other embodiments, electrolyte membrane 330 is based on derivatives of polybenzimidazole (PBI) or phosphoric acid.

Each container of hydrogen-side humidifier 100-H and oxygen-side humidifier 100-O can be provided as described herein above. Additionally, hydrogen-side humidifier 100-H and oxygen-side humidifier 100-O are each equipped with their own water-gas void volume disposed about a hollow core member 120-H or 120-O, respectively, a water-gas inlet 130-H and 130-O, and a gas outlet 140-H and 140-O disposed on an outer surface of the container. As described herein above, at least a portion of hollow core member 120-H and 120-O is gas permeable and in fluid communication with the water-gas void volume. Further, as described above hollow core member 120-H and 120-O is further fitted with a reactant gas inlet 170-H and 170-O and a reactant gas outlet 180-H and 180-O for passage of said reactant gas through the hollow core member. Reactant gas outlet 180-H and 180-O are equipped to be in fluid communication with fuel cell 300 to deliver a humidified reactant gas to said fuel cell on either the hydrogen side or oxygen side of fuel cell 300.

Humidifier 100-H of fuel cell system 300 can be fed with a reactant gas that is hydrogen, in some embodiments. Humidifier 100-O of fuel cell system 300 can be fed with a reactant gas that is air, oxygen, or mixtures of air and oxygen, in other embodiments. Thus, in some embodiments, a fuel cell system of the invention is equipped to humidify both hydrogen and oxygen-based reactants. Reactant gases hydrogen and the oxygen source can be provided at low pressures, for example, in a range from about 1 psig to about 10 psig, or from about 2 psig to about 5 psig, in other embodiments. In some embodiments, reactant gases hydrogen and the oxygen source can be provided at higher pressures as well, for example, in a range from about 10 psig to about 100 psig. In some embodiments, reactant gases hydrogen and the oxygen source can be provided at any targeted pressure including, about 0.1, 0.5, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, and 100 psig, inclusive of all values in between and fractions thereof.

Referring now to FIG. 3 in conjunction with FIGS. 1 and 2, in some embodiments, humidifier 100-H and 100-O are further equipped with a water drainage valves 190-H and 190-O, respectively. As described above, water drainage valves 190-H and 190-O can function as a modulator of the water level of water layer 150 (FIGS. 1 and 2) allowing excess water to be removed. Drainage valve 190-H and 190-O can also be equipped with a detector to insure that the water level of water layer 150 does not drop below a certain level. In some such embodiments, water drainage valve 190-H and 190-O can be equipped to be in electronic communication with an exogenous water supply to deliver supplemental water to water-gas void volume 110 on and as needed basis. In some embodiments, fuel cell system 300 shares the same exogenous water supply with separate connections thereto via water-gas inlet 140-H and 140-O, respectively. In other embodiments, fuel cell system 300 is provided with separate exogenous water supply for hydrogen-side humidifier 100-H and oxygen-side humidifier 100-O.

Referring back to FIG. 2, in conjunction with FIG. 3, in some embodiments, a comparable pair of humidifiers 200 can be used in the same manner as hydrogen-side humidifier 100-H and oxygen-side humidifier 100-O, but each is further equipped with a sensor system comprising an upper sensor 210a and a lower sensor 210b (FIG. 2), either or both of which can be in electronic communication with water drainage valve 190-H and 190-O, in each respective humidifier 100-H and 100-O. The sensor system can be used to modulate the level of water in water layer 150 of water-gas void volume 110. In some embodiments, upper sensor 210a is in electronic communication with drainage valve 190-H and 190-O, in each respective humidifier 100-H and 100-O to insure that the water level does not exceed a certain level. In some such embodiments, if water layer 150 reaches upper sensor 210a, this can trigger an electronic signal to water drainage valve 190-H and 190-O, in each respective humidifier 100-H and 100-O signaling it to open and drain water. In some embodiments, lower sensor 210b is in electronic communication with an exogenous water source that can deliver additional water to the water-gas void volume 110 as needed.

In some embodiments, humidifier 100-H and 100-O, configured as shown in FIG. 1 or FIG. 2, are equipped with gas outlet 140-H and 140-O, each of which can redirect the reactant gas through to reactant gas inlet 170-H and 170-O, respectively. In some embodiments, gas outlet 140-H and 140-O can be vented to exhaust. In some embodiments, water vapor exiting gas outlet 140-H and 140-O can also be fed into reactant gas inlet 170-H and 170-O along with the recycled reactant gas. In some embodiments, water vapor entrained with excess reactant gas can be condensed and delivered back into water-gas inlet 130-H and 130-O. In some embodiments, fuel cell system 300 humidifiers 100-H and 100-O comprise a reactant gas inlet 170-H and 170-O, respectively, equipped to receive both externally provided reactant gas and recycled reactant gas from gas outlet 140-H and 140-O. In some embodiments, humidifier 100-H and 100-O includes water-gas inlet 130-H and 130-O which is in fluid communication with a fuel cell 305 to receive, i.e. recycle, water generated in the fuel cell as well as the reactant gas.

The components of humidifiers 100-H and 100-O can be provided in any material that is substantially corrosion resistant. In some embodiments, the container is a plastic. In such embodiments, humidifiers 100-H and 100-O can benefit from the relatively light weight of plastic. This can be important in downstream applications, such as in PEM fuel cell devices that might be used in space. In other embodiments, the container is stainless steel. In some embodiments, hollow core member is a permeable tube bundle comprising Nafion or other permeable membrane which allows passage of water vapor therethrough.

In some embodiments, the present invention provides a method of humidifying a reactant gas in a fuel cell system 300 described herein above and shown in FIG. 3. The method includes providing a fuel cell system 300 with the requisite hydrogen-side humidifier 100-H and oxygen-side humidifier 100-O and passing a reactant gas through each humidifier. Thus, methods of the invention include passing a reactant gas that is hydrogen through hydrogen-side humidifier 100-H and oxygen, air, or mixtures thereof in oxygen-side humidifier 100-O. Methods of the invention include a rate of passing of reactant gas through the reactant gas inlet 170-H and 170-O, respectively in a range from about x to about y.

In some embodiments, fuel cell system 300 is part of a downstream transport application such as a terrestrial vehicle, manned and unmanned aerospace vehicles, boats, submarines and the like. One skilled in the art will appreciate that fuel cell system 300 can be scaled to any application, including, with out limitation, scaling for use in mobile phones, laptops, and other mobile small device applications where a battery might be employed. In some embodiments, where an application requires greater power, fuel cell system 300 may be part of a plurality of fuel cells in a stacked array. In some such embodiments, a single hydrogen-side humidifier 100-H can service each individual hydrogen side anode 310 in the stacked array and a single oxygen-side humidifier 100-O can service each individual oxygen side cathode 320 in the stacked array. Alternatively, in some embodiments, each fuel cell system 300 in a stacked array can be equipped with individual humidifiers.

While humidifiers of the present invention have been generally described with respect to their use in PEM fuel cells utilizing hydrogen and oxygen reactant gases, one skilled in the art will appreciate that the humidifier design can be applied to the humidification of any gas for any application, for example, in the humidification of air and/or oxygen in ventilator systems, environmental chambers, and the like.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A fuel cell system comprising:
    a fuel cell; and
    a humidifier comprising:
        a vertically oriented container having a water-gas void volume disposed about a hollow core member, the water-gas void volume being configured to house a lower water layer and an upper gas layer in contact with one another in a single contiguous space;
        a water-gas inlet disposed on an outer surface of said container and configured to establish fluid communication with a section of the water-gas void volume housing the lower water layer; and
        a gas outlet disposed on the outer surface of said container and configured to establish fluid communication with a section of the water-gas void volume housing the upper gas layer;
            wherein at least a portion of said hollow core member is gas permeable and in fluid communication with said water-gas void volume;
            wherein said hollow core member is further fitted with a reactant gas inlet and a reactant gas outlet configured for passage of a reactant gas through said hollow core member; and
            wherein said reactant gas outlet is in fluid communication with said fuel cell and configured to deliver a humidified reactant gas to said fuel cell.

2. The fuel cell system of claim 1, wherein said reactant gas is selected from the group consisting of air, oxygen, mixtures thereof and hydrogen.

3. The fuel cell system of claim 1, further comprising:
    a sensor system in electronic communication with a water drainage valve and configured to control the amount of water in the lower water layer of said water-gas void volume.

4. The fuel cell system of claim 1, wherein said gas outlet is configured to redirect said reactant gas from said upper gas layer through said reactant gas inlet.

5. The fuel cell system of claim 1, wherein said reactant gas inlet is configured to receive externally provided reactant gas and recycled reactant gas from said gas outlet.

6. The fuel cell system of claim 1, wherein said water-gas inlet is in fluid communication with said fuel cell and configured to recycle water generated in said fuel cell and said reactant gas.

7. A method of humidifying a reactant gas in a fuel cell system comprising:
    providing a humidifier comprising:
        a vertically oriented container having a water-gas void volume disposed about a hollow core member, the water-gas void volume being configured to house a lower water layer and an upper gas layer in contact with one another in a single contiguous space;
        a water-gas inlet disposed on an outer surface of said container and configured to establish fluid communication with a section of the water-gas void volume housing the lower water layer; and
        a gas outlet disposed on the outer surface of said container and configured to establish fluid communication with a section of the water-gas void volume housing the upper gas layer;
            wherein at least a portion of said hollow core member is gas permeable and in fluid communication with said water-gas void volume;
            wherein said hollow core member is further fitted with a reactant gas inlet and a reactant gas outlet configured for passage of said reactant gas through said hollow core member; and
            wherein said reactant gas outlet is in fluid communication with said fuel cell and configured to deliver a humidified reactant gas to said fuel cell; and
    passing the reactant gas through said humidifier;
        wherein the water-gas void volume is filled with a lower water layer and an upper gas layer when passing the reactant gas therethrough.

8. The method of claim 7, wherein said reactant gas is hydrogen or oxygen.

9. The method of claim 7, wherein the fuel cell system further comprises a sensor system in electronic communication with a water drainage valve that is configured to control the amount of water in the lower water layer of said water-gas void volume.

10. The method of claim 7, wherein said gas outlet is configured to redirect reactant gas from said upper gas layer through said reactant gas inlet.

11. The method of claim 7, wherein said reactant gas inlet is configured to receive externally provided reactant gas and recycled reactant gas from said gas outlet.

12. The method of claim 7, wherein said water-gas inlet is in fluid communication with said fuel cell and configured to recycle water generated in said fuel cell and said reactant gas.

* * * * *